March 31, 1925.  1,531,786

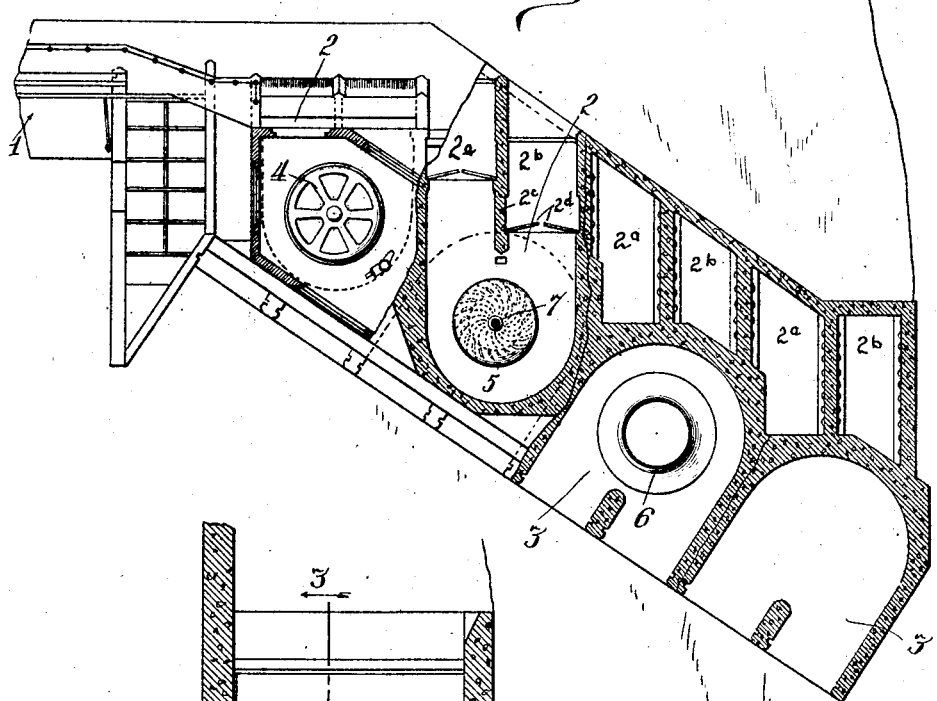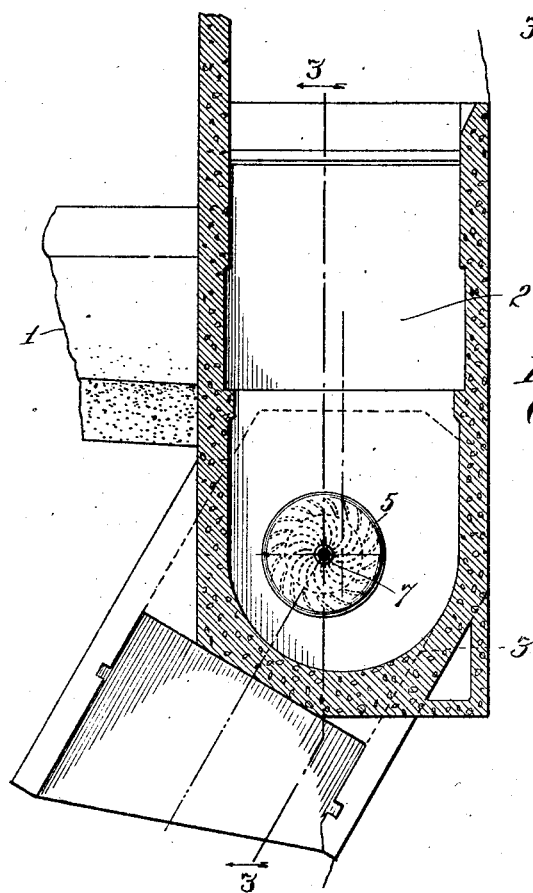

R. K. HOLLAND

HYDRAULIC POWER PLANT

Filed Nov. 20, 1922  3 Sheets-Sheet 2

Inventor
Ray K. Holland

Attorney

March 31, 1925.

R. K. HOLLAND 1,531,786

HYDRAULIC POWER PLANT

Filed Nov. 20, 1922

Inventor

Ray K. Holland

Patented Mar. 31, 1925.

1,531,786

UNITED STATES PATENT OFFICE.

RAY K. HOLLAND, OF ANN ARBOR, MICHIGAN, ASSIGNOR TO HOLLAND, ACKERMAN & HOLLAND, OF ANN ARBOR, MICHIGAN, A COPARTNERSHIP COMPOSED OF GEORGE E. ACKERMAN, RAY K. HOLLAND, AND HOWARD K. HOLLAND.

HYDRAULIC POWER PLANT.

Application filed November 20, 1922. Serial No. 602,228.

*To all whom it may concern:*

Be it known that I, RAY K. HOLLAND, a citizen of the United States, and a resident of Ann Arbor, in the county of Washtenaw and State of Michigan, have invented certain new and useful Improvements in Hydraulic Power Plants, of which the following is a true and exact specification, such as will enable others skilled in the art to which it appertains to make and use the same.

This invention relates to hydraulic power-plants, most commonly embodied in hydro-electric plants.

The invention relates particularly to that type of plant of the general character set forth which includes a dam spanning a stream and one or more pen-stocks or turbine-flumes and draught or discharge pit through which the power-generating water flows to actuate a turbine associated with each penstock and its draught-pit.

The invention applies particularly to that type of plant of the particular nature set forth in the preceding paragraph wherein a turbine or turbines used, rotate about vertical or substantially vertical axes, for reasons hereinafter particularly set forth.

The particular objects of the invention are:

First: To provide means whereby, at the smallest cost of excavation and construction, the highest degree of plant efficiency is obtained.

Second: To provide a structure of the character defined in the preceding paragraph wherein the turbine may be disposed at various points relatively to the middle vertical plane of the penstock or turbine-flume without affecting its location with respect to the middle vertical plane of the draught-pit.

Third: To provide a structure of the character hereinbefore set forth wherein, by varying the usual relative arrangement of the flume and draught-pit, the foregoing objects are attained without sacrifice of any element promoting or tending to promote efficiency in plants of the particular type referred to as ordinarily constructed.

Exemplary embodiments of the invention are illustrated in the accompanying drawings in which:

Figure 1 is a plan section of one end portion of a dam equipped with a multiple unit power plant constructed in accordance with the invention.

Figure 2 is a plan section of a single unit plant including a penstock, turbine and draught-pit.

Figure 3:
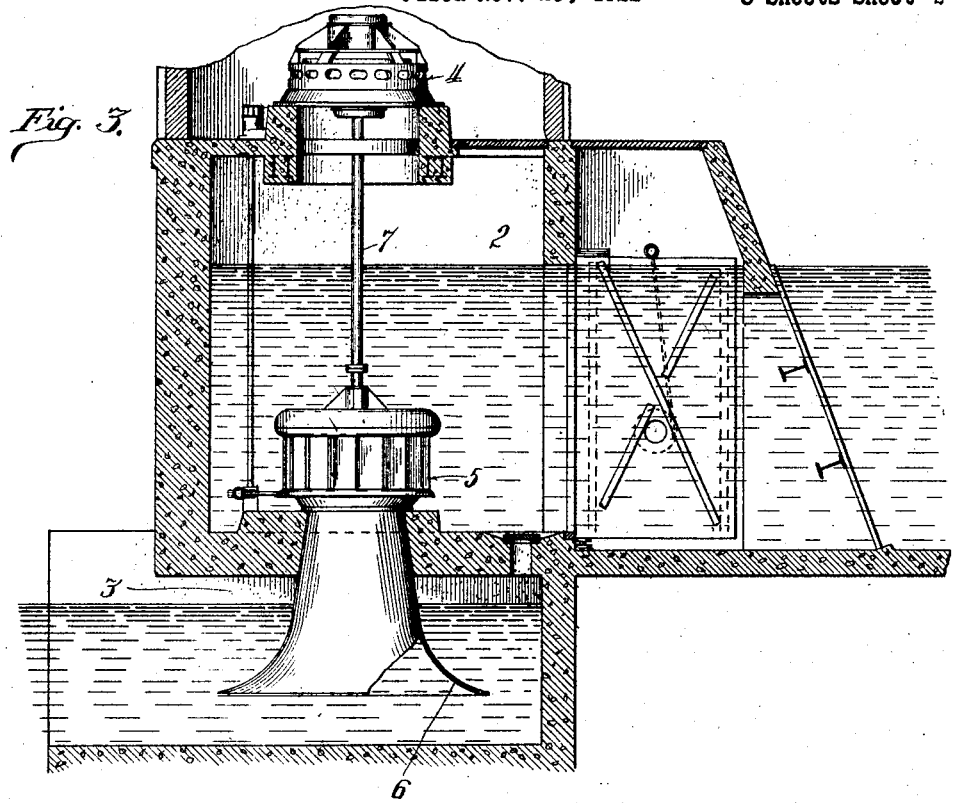
Figure 3 is a vertical transverse section on an enlarged scale on the line 3—3 of Figure 2.

The modern hydraulic power plant comprises a dam spanning a stream or the outlet of a lake or other large body of water affording a more or less constant flow of water, the power-house being generally mounted in the dam adjacent a bank of the stream or shore of the body of water, and the turbines and water ducts associated therewith being located in the power-house.

As the invention is limited particularly to the water ducts associated with the turbine or turbines without regard to the particular type or features of construction of the dam and power-house, and further, has reference particularly to said ducts when associated with a particular type of turbine, viz., that type which rotates on a vertical or substantially vertical axis, the following specification will be limited to part or parts of the structure to which the invention most directly relates.

In order that the invention involved may be best understood and its scope and advantages fully appreciated, it is essential that certain advantages resulting from the use of the vertical turbine as distinguished from those rotating on horizontal axes, should be briefly reviewed.

It is well known to those skilled in the art that the vertical shaft turbine is more efficient than the other type above referred to. Certain types or designs of draft-tubes associated with the vertical shaft turbine, promote efficiency of the latter.

There are some factors which determine the most desirable location of the turbine in the penstock or turbine-flume in order to secure maximum efficiency, the most important of these factors being the width of said flume, and this in turn is, from the standpoint of economy of construction, determined primarily by the velocities of water in the flume and by the floor-space in the power-house required for the generator or other machine to be actuated by the turbine. In short, the ultimate aim is to secure the maximum plant efficiency without disturbing what is well known to be the most economical construction as regards the power-house, which includes the penstock or turbine-flume and draught-pit.

Thus, where the floor-space required for the generator or the like determines that the penstock or turbine-flume shall be as narrow as the permissible velocity in the flume will allow, turbine-efficiency requires that the turbine shall be located laterally of the middle vertical plane of the penstock or turbine-flume, and, in the power-plants of this type as heretofore constructed, such location of the turbine in said penstock required similar disposition of the draught-tube in the draught-pit; also that the latter be similarly narow and therefore of correspondingly greater depth, and these limitations in many cases prevent the use of most efficient type of draught-tube.

In cases where power-house floor-space requirements determine a sufficiently wide turbine flume to permit the turbine to be disposed in the middle vertical place of said flume (always with reference to the axis of rotation of the turbine) it has not followed nor does it follow, in the construction as heretofore most commonly used, that the draught-pit was of sufficient width to permit the most efficient type of draught-tube to be associated with the turbine without necessitating greater depth and consequently greater cost of excavation and construction than is required for the embodiment of the present invention, this width of the draught-pit being determined heretofore by the width of the penstock or turbine-flume because economy of construction requires that the discharge end portion of the penstock shall be supported wholly upon the intake end portion of the draught-pit.

The main factor determining the permissibility of employing the most efficient type of draught-tube, is the width of the draught-pit and the present invention enables the requisite width to be secured not only without increasing the cost of construction or the normal space requirements, but on the contrary, at the same time effecting economy in cost and affording other advantages which are fully set forth hereinafter.

In the drawings are shown a dam (which may be of any suitable type) spanning a stream. Adjacent one bank of said stream are the penstock or penstocks 2 and draught-pit or draught-pits 3 which constitute parts of the power-house in which the generator or generators 4 or other machinery to be driven is or are located, the width of the penstock or turbine-flume 2, being determined by the floor-space in the superstructure of the power-house required by the generator or other machine associated with the turbine 5 located in the discharge end-portion of the penstock 2, the side walls of the latter being parts or supports for the walls of the superstructure of the power-house.

Associated with each turbine 5 is a draught-tube 6 which is disposed in the intake end-portion of the draught or discharge pit 3, all water flowing from the penstock into the draught-pit being obliged to pass through the turbine 5 and its draught-tube 6. The turbine is connected by means of a vertical shaft 7 with the generator 4, and, as the latter is most commonly employed in hydraulic power-plants, it is needless to refer to other types of machines which might be substituted for the same.

The water flowing through the turbine enters the turbine-head substantially radially from all sides and in order that such flow may be equal from all sides, it is very commonly necessary, in view of the fact that the penstock is relatively narrow, to dispose the turbine laterally offset from the middle vertical plane of the penstock as shown in Figure 2.

Economy of construction-cost requires that the discharge end-portion of the penstock shall be supported directly upon the intake end-portion of the draught-pit and this has heretofore necessitated that the draught-pit be of the same width as the penstock. This, in turn, in all instances where the turbine is laterally offset as above pointed out, resulted in offsetting the draught-tube laterally away from the middle vertical plane of the draught-pit, thus interfering with uniformity of discharge of water from the draught-tube and necessitating greater depth of the draught-pit at greater cost of construction. Furthermore, the greater depth of the draught-pit does not overcome fully its offset location and does not permit the use of the most efficient type of draught-tube, whereas a wider and shallower draught-pit in which the draught-tube is located midway between the side walls, does permit the use of the most efficient type of draught-tube and effects economy in cost of excavation. Consequently, the highest plant efficiency is obtainable where the width of the draught-pit may be made amply sufficient, its depth reduced to the most desirable point and the draught-tube located in the middle vertical plane of said pit.

Figure 4:
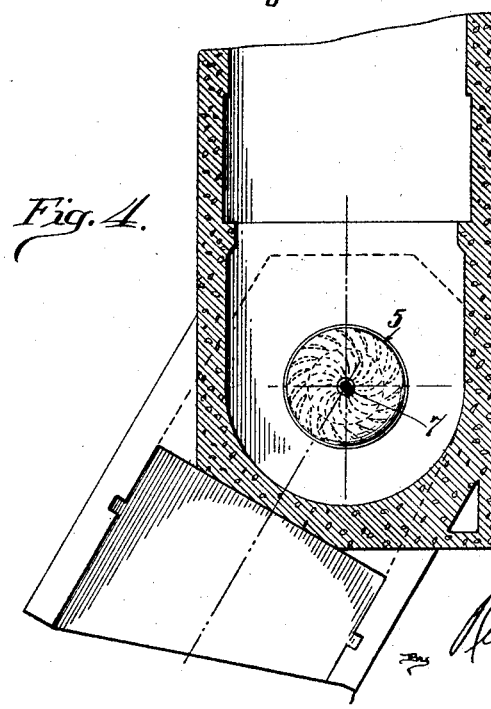
Figure 4 is a view similar to Figure 2 showing the turbine in a different position relatively to the penstock and wherein the latter and the draught pit are slightly differently arranged relatively to each other.
Figure 5:
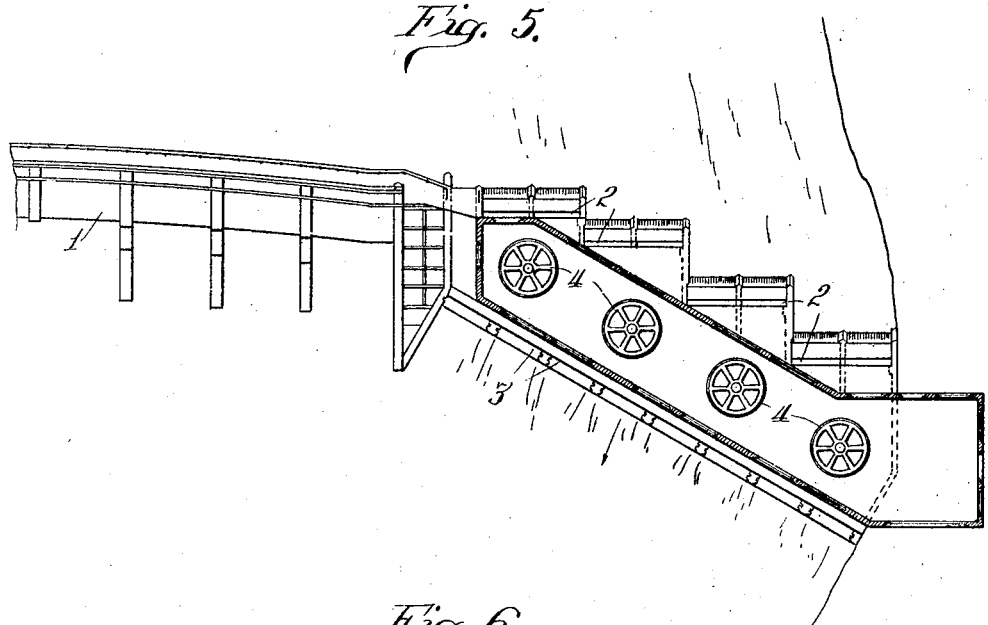
Figure 5 is a view similar to Figure 1 showing the entire dam.

This invention permits these conditions to be present in all cases, including those in which, as shown in Figure 4, the width of the penstock permits the turbine to be located in the middle vertical plane thereof, and this is accomplished by the simple expedient of arranging the penstock and draught-pit out of alignment with each other or, in other words, to extend slightly angularly relatively to each other. This relative arrangement affords a wide range of flexibility to meet every exigency presented in plants of this character and affords further advantages which, in many instances, effect enormous savings in cost of constructtion.

The exemplary embodiments shown in the drawings constitute only a few of the many that may be designed to best meet the conditions of each case. Thus, in the embodiment shown in Figure 1, which is a multiple unit plant, wherein all penstocks are of equal width, and similarly all draught-pits, which would not necessarily be true of many other plants, the angularity of the draught-pits is such as to project the water toward the middle of the stream and in some instances, as where a rocky bank opposes the discharge end portion of the penstock or penstocks, this angularity would obviate blasting and excavation of this bank for a considerable distance, and, in other instances, as where the dam spans a sharp bend in the stream, the water delivered from the draught-pits will be caused to follow substantially the natural direction of the flow of the stream.

While the draught-pits cover a greater area than the penstocks, the cost of construction is much less than that of deeper excavation and smaller area.

Figure 6:
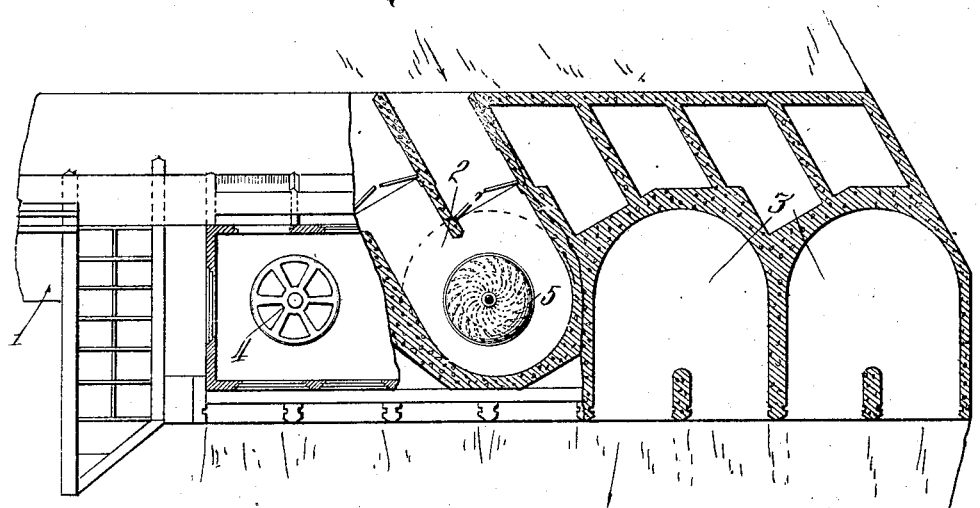
Figure 6 is a view similar to Figures 1 and 5 showing a reverse arrangement of penstocks and draught-pits.

Figures 1 and 6 show, respectively, different relative arrangements of penstocks and draught-tubes with respect to the dam and shore line and serve to indicate the extent of flexibility of embodiment of the invention to meet the conditions presented in various installations without, however, fixing limits of flexibility, and, similarly, Figures 1 and 4 will serve to indicate the flexibility of embodiment with respect to relative widths of penstocks and draught-pits and location of turbines in the former without interfering with the location of the draught-tubes midway between the side walls of the draught-pits.

The structure of Fig. 6 is identical with that of Fig. 1 in every respect in so far as the portion of the dam embodying the invention is concerned, the only difference lying in the fact that this portion of the dam extends at an angle to the remainder thereof to accommodate the same to a different shore line than is presented in Fig. 1.

Each of the penstocks 2 is, preferably, divided at the intake end into two parts or sluices $2^a$ and $2^b$, respectively, separated from each other by the partition wall $2^c$ to thereby provide relatively narrow sluices each controllable independently of the other by sluice gates $2^d$, this detail of construction being old in the art and constituting no part of the present invention.

I claim as my invention:—

1. In a hydraulic power plant, a penstock or turbine flume, a turbine therein having a vertical axis of rotation laterally offset from the vertical plane of the middle of said flume, and a draught-pit below said turbine flume extending angularly relatively thereto and having its middle vertical plane disposed to substantially intersect the axis of rotation of said turbine.

2. In a hydraulic power plant, a penstock or turbine flume and a draught or discharge pit disposed at respectively different elevations, the discharge end of the former discharging into the intake end of the latter, said draught or discharge pit being of greater width than the turbine flume and extending angularly relatively thereto, a turbine having a vertical axis of rotation mounted in the communicating portions of said flume and pit and having its axis of rotation offset laterally from the vertical plane of the middle of said penstock or turbine flume and substantially in the middle vertical plane of the draught or discharge pit.

3. In a hydraulic power plant, a penstock or turbine flume, a vertical axis turbine in the discharge end portion thereof having its axis offset laterally from the middle vertical plane of said flume, and a draught-pit or discharge flume communicating with the discharge end portion of said penstock or turbine flume and extending angularly to the said middle vertical plane thereof and having its middle vertical plane substantially intersecting the axis of said turbine.

4. In a hydraulic power plant, a penstock or turbine flume, a draught or discharge pit, the intake end portion of the latter disposed below the draught or discharge end portion of the former and supporting the same, said discharge-pit being of greater width than said penstock or turbine flume, a turbine in the latter having a vertical axis of rotation offset laterally from the middle vertical plane thereof, the draught or discharge pit disposed relatively to the penstock or turbine flume so as to bring the middle thereof substantially coincident with the axis of the turbine.

5. In a hydraulic power plant, a penstock or turbine flume and a draught or discharge-pit, the intake end of the latter supporting the discharge end portion of the former and communicating therewith, a turbine mounted in the discharge end portion of the penstock or turbine flume and offset laterally from the middle vertical plane thereof, the axis of rotation of said turbine being disposed substantially midway between the side walls of the draught or discharge pit, the latter being of greater width than the penstock or turbine flume and disposed out of alignment therewith.

6. In a hydraulic power plant, a draught or discharge-pit and a penstock or turbine flume, the former arranged above the latter and having its discharge end portion supported upon the intake end portion of the draught or discharge pit, the discharge end portion of said penstock or turbine flume presenting a semi-cylindrical end-wall, a vertical turbine disposed eccentrically of said end-wall, the intake end portion of the draught or discharge-pit presenting an end-wall having every portion thereof disposed at least as far from the axis of the turbine as the nearest adjacent points in the side walls thereof are disposed therefrom and having both said side-walls disposed substantially equidistantly from said axis, the distance of said side-walls from the axis of said turbine being substantially equal to the distance between the farthest removed side-wall of the turbine flume from the axis of the turbine.

7. In a hydraulic power plant, a draught-pit, a turbine disposed with its axis equidistant from both side-walls thereof, a penstock or turbine flume disposed above the draught-pit and supported at its discharge end portion upon the intake end portion of the latter, one side-wall of the turbine flume being as far removed from the turbine axis as are the side-walls of the draught-pit, and the other side-wall of the turbine flume being more closely approximate the said turbine axis.

8. In a hydraulic power plant, a penstock or turbine flume and a draught or discharge pit, the latter of greater width than the former and arranged below and in supporting relation thereto, a turbine mounted in the penstock or turbine flume and disposed laterally of the middle thereof with its axis disposed in the middle of the draught or discharge pit the latter extending angularly to the penstock or turbine flume and having the plane of the inner face of one side wall thereof intersecting the similar plane of the inner face of the side-wall of the penstock or turbine flume at a point rearward, and the similar planes of the other side-walls intersecting at a point forward of the diametric plane of the turbine axis which extends perpendicularly of the side walls of the penstock or turbine flume.

9. In a multiple unit hydraulic power plant, a plurality of penstocks or turbine flumes disposed side by side, adjacent flumes being separated from each other by a single wall, a turbine disposed in each of said flumes offset from the middle vertical plane thereof, a draught or discharge-pit associated with each penstock or turbine flume and of greater width than the latter, the axes of the turbine being disposed in the middle vertical planes of the respective draught or discharge pit.

10. In a hydraulic power plant a penstock or turbine-flume and a draught-pit associated therewith, the latter of greater width than the former, the side-walls of said flume and pit angularly intersecting each other, a vertical turbine associated with said flume and said pit, said turbine being located with its axis of rotation substantially in the middle vertical plane of the draught-pit.

11. In a hydraulic power plant adapted for a vertical turbine, a penstock or turbine flume, a draught or discharge pit disposed below the same and communicating at one end with one end of said penstock or turbine flume, said flume and pit angularly disposed relatively to each other and the former supported at its discharge end upon the intake end of said pit, the latter of greater width than the said flume, the relative arrangement of said flume and pit being such that a vertical turbine may be disposed with its axis of rotation intersecting the middle vertical plane of the draught pit without limitation to its similar location with respect to the middle vertical plane of said flume.

12. In a multiple unit hydraulic power plant, a plurality of penstocks or turbine flumes arranged side by side, contiguous flumes separated from each other by a wall common to both, and a draught pit associated with each of the said flumes, said draught-pits being similarly arranged and extending angularly of the said flumes and each thereof being of greater width than the flume with which it is associated.

RAY K. HOLLAND.